March 6, 1956     G. W. MONINGER     2,737,050
THERMOMETER RECEPTACLE FOR ATTACHMENT TO PIPES
Filed May 27, 1953

INVENTOR:
George W. Moninger,
BY: Donald G. Dalton
HIS ATTORNEY.

United States Patent Office 2,737,050
Patented Mar. 6, 1956

2,737,050

THERMOMETER RECEPTACLE FOR ATTACHMENT TO PIPES

George W. Moninger, Fairless Hills, Pa.

Application May 27, 1953, Serial No. 357,753

1 Claim. (Cl. 73—343)

This invention relates to temperature measuring devices and in particular to a device for holding the measuring instrument in position against the outside surface of a pipe or the like.

In tracing troubles encountered in processes involving fluids, it is often necessary to obtain accurate measurement of the temperature of the fluids while the same are flowing through pipes. While the best data are obtained by immersing the measuring device in the flow stream, this is not always practical. It is difficult, if not impossible, to anticipate locations for the temperature stations during design and the provision of necessary openings in piping after installation is extremely expensive.

It is an object of the present invention to provide a simple device which facilitates the measurement of temperature of a fluid flowing through a pipe without the necessity of inserting the measuring instrument into the flow stream.

Another object is to provide a device of the above character which may be readily shifted from point to point along the pipe as required.

These and other objects will be made apparent in the following specification when read in conjunction with the attached drawings in which.

Figure 1:
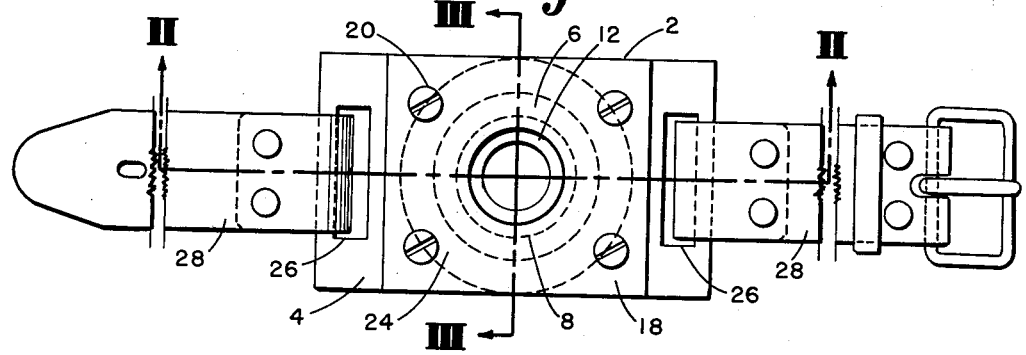
Figure 1 is a plan view of the device of the present invention "as assembled"
Figure 2:
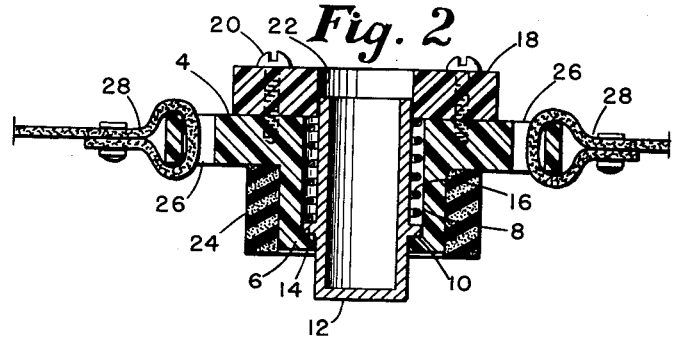
Figure 2 is a cross section thereof taken along the line II—II of Figure 1.
Figure 3:
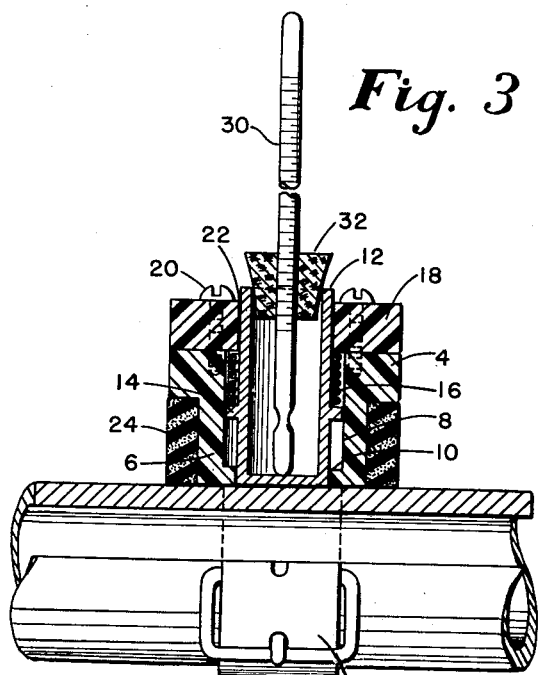
Figure 3 is a view showing the device in position against a pipe, the device being shown in cross section taken along line III—III of Figure 1.

With particular reference to the drawings, the device, which may be termed a thermometer-well, comprises a body member indicated in general by the numeral 2 consisting of a rectangular plate-like portion 4 carrying a boss 6 centrally disposed on the underside thereof. The member 2 is formed from a material possessing low thermal conductivity; a thermal-setting plastic is suitable for this purpose. A counterbored hole 8 is formed in the member 2 to provide an internal shoulder 10 at the bottom end of boss 6. A relatively thin-walled cylindrical cup-like receptacle 12 formed of material possessing high thermal conductivity, preferably copper, and having a collar 14 intermediate the ends of the receptacle is slidably positioned in bore 8 with the bottom of collar 14 resting on the inner face of the shoulder 10. A compression spring 16 is positioned around the cup and seated against the upper face of the collar 14. The spring is maintained in bore 8 by cap-plate 18, preferably of material of low thermal conductivity, fastened to the body member by machine screws 20. As assembled the closed end of receptacle 12 extends a short distance beyond the outer surface of boss 6, and the receptacle is of sufficient length to project slightly into hole 22 in plate 18. Plate 18 thus serves to guide the movement of the receptacle as the device is placed in operating position. A tightly fitting sleeve 24 of sponge rubber, felt or the like is disposed over boss 6, the length of this sleeve being just slightly greater than the boss so that the material of the sleeve is compressed slightly when the device is pressed against a pipe or conduit. The plate-like portion 4 of the body member is provided with slots 26 located on either side of the boss to receive straps 28 which may be of any conventional form for securing the device to a pipe or conduit as indicated in Figure 3.

When in position receptacle 12 is forced upwardly in the counterbored hole against spring 16. The closed end of the cup is therefore held against the surface of the pipe insuring good thermal contact therewith. The outer sleeve 24 is also compressed by the strapping to seal and further insulate the area of the receptacle 12 and pipe. A thermometer 30 or other temperature measuring device is then inserted in cup 12 to contact the bottom thereof and held in this position by a cork collar 32. Since the receptacle 12 is a metal such as copper, is well insulated against heat loss, and is maintained in good thermal contact with the surface of the pipe, temperature of the fluid flowing in the latter is readily and accurately determined without disturbing the flow or piping arrangement. The device, being easily movable, the temperature readings can be made at any point along the pipe as required.

While I have shown and described one specific embodiment of my invention it is apparent that modifications may arise; therefore I do not wish to be limited exactly thereto, but only by the scope of the appended claim.

I claim:

A device of the character described comprising a body portion of low thermal conductivity having a centrally disposed boss extending from one surface thereof, said body portion being counterbored along the longitudinal axis of the boss to provide a bore having an internal shoulder adjacent the free end of the boss; a cap-plate having a hole therethrough secured to said body portion with said hole concentric with the bore of the body portion; a cup-shaped receptacle of high thermal conductivity having a collar attached intermediate the ends of the cup, said receptacle being slidably disposed in said bore with the closed end of the cup extending through the end of the bore and the open end of the cup extending into the hole in the cap-plate; a compression spring disposed about the receptacle between the collar thereof and the cap-plate to resiliently urge said receptacle in the direction of its closed end; means for detachably securing said body portion to a pipe or the like and a sleeve of compressable material positioned about the boss of the body portion and bearing upon the body portion, said sleeve having a length sufficiently greater than that of the boss when the sleeve is uncompressed to provide a seal with the surface of a pipe when the body portion is attached thereto by the securing means.

References Cited in the file of this patent

UNITED STATES PATENTS

| 2,048,512 | Oakley | July 21, 1936 |
| 2,302,640 | Schmidt | Nov. 17, 1942 |
| 2,379,317 | Picciano | June 26, 1945 |
| 2,484,585 | Quinn | Oct. 11, 1949 |

FOREIGN PATENTS

| 773,130 | France | Aug. 27, 1934 |